(12) United States Patent
Jung et al.

(10) Patent No.: US 9,454,938 B2
(45) Date of Patent: Sep. 27, 2016

(54) DISPLAY DEVICE AND DRIVING METHOD THEREOF

(71) Applicant: Samsung Display Co., Ltd., Yongin, Gyeonggi-Do (KR)

(72) Inventors: Kwang-Chul Jung, Seongnam-si (KR); Sun Hwa Lee, Yongin-si (KR); Mee Hye Jung, Suwon-si (KR)

(73) Assignee: Samsung Display Co., Ltd. (KR)

( * ) Notice: Subject to any disclaimer, the term of this patent is extended or adjusted under 35 U.S.C. 154(b) by 27 days.

(21) Appl. No.: 14/662,790

(22) Filed: Mar. 19, 2015

(65) Prior Publication Data

US 2016/0155393 A1    Jun. 2, 2016

(30) Foreign Application Priority Data

Nov. 27, 2014 (KR) ........................ 10-2014-0167647

(51) Int. Cl.
| | |
|---|---|
| *G09G 3/36* | (2006.01) |
| *G02F 1/1368* | (2006.01) |
| *G02F 1/1362* | (2006.01) |
| *H01L 27/12* | (2006.01) |

(52) U.S. Cl.
CPC ............ *G09G 3/3607* (2013.01); *G02F 1/1368* (2013.01); *G02F 1/136213* (2013.01); *G02F 1/136286* (2013.01); *H01L 27/1255* (2013.01)

(58) Field of Classification Search
CPC .............. G09G 3/3607; G02F 1/1368; G02F 1/136213; G02F 1/136286; H01L 27/1255
See application file for complete search history.

(56) References Cited

U.S. PATENT DOCUMENTS

| | | | |
|---|---|---|---|
| 8,094,250 B2 | 1/2012 | Lee et al. | |
| 2009/0167660 A1* | 7/2009 | Wang | G09G 3/3637 345/89 |
| 2009/0195488 A1* | 8/2009 | Takeuchi | G02F 1/134336 345/90 |

FOREIGN PATENT DOCUMENTS

| | | |
|---|---|---|
| JP | 2005-338152 | 12/2005 |
| JP | 2006-259134 | 9/2006 |
| KR | 1020050060730 A | 6/2005 |
| KR | 1020130013151 A | 2/2013 |

* cited by examiner

*Primary Examiner* — Abbas Abdulselam
(74) *Attorney, Agent, or Firm* — Innovation Counsel LLP

(57) ABSTRACT

A display device includes a first pixel connected to a gate line, a data line, and a storage line for transmitting a storage signal of which a voltage level is changed at least once for one frame. The first pixel includes first, second, and third subpixels. The first subpixel includes a first switching element connected to the gate and data lines, a first liquid crystal capacitor connected to the first switching element, and a first storage capacitor. The second subpixel includes a second switching element connected to the gate and data lines, a second liquid crystal capacitor connected to the second switching element, and a second storage capacitor. The third subpixel includes a third switching element connected to the gate and data lines, and a third liquid crystal capacitor connected to the third switching element. The first and second storage capacitors are connected to the storage line.

20 Claims, 14 Drawing Sheets

_US 9,454,938 B2_

DISPLAY DEVICE AND DRIVING METHOD THEREOF

CROSS-REFERENCE TO RELATED APPLICATION

This application claims priority to and the benefit of Korean Patent Application No. 10-2014-0167647 filed in the Korean Intellectual Property Office on Nov. 27, 2014, the entire contents of which are incorporated herein by reference.

BACKGROUND (a) Technical Field

The present application relates to a display device and a driving method thereof. More particularly, the present application relates to a display device for improving visibility and a driving method thereof.

(b) Description of the Related Art

Display devices such as a liquid crystal display (LCD) and an organic light emitting device generally include a display panel that includes a plurality of pixels including switching elements and a plurality of signal lines, a gray voltage generator that generates a gray reference voltage, a data driver that uses the gray reference voltage to generate a plurality of gray voltages and applies gray voltages corresponding to an input image signal among the generated gray voltages to a data line as a data signal, and the like.

Among those, the liquid crystal display includes two display panels including pixel electrodes and opposed electrodes, and a liquid crystal layer disposed therebetween and having dielectric anisotropy. The pixel electrodes are arranged in a matrix type and are connected to switching elements such as a thin film transistor (TFT), and the like, and sequentially receive a data voltage row-by-row. The opposed electrodes are formed over the display panel and are applied with a common voltage (Vcom). A voltage applied to the pixel electrodes and the opposed electrodes generates an electric field in the liquid crystal layer, and the strength of the electric field is controlled to control transmittance of light transmitting through the liquid crystal layer, thereby obtaining desired images.

The liquid crystal display may have reduced side visibility compared to front visibility. In order to solve this problem, a method of dividing one pixel into two subpixels and making voltages of the two subpixels different has been proposed. Regarding the method, for each single piece of image data, voltages caused by different gamma curves must be input to two subpixels. To supply the voltages induced by the respective gamma curves to the two subpixels, signal lines such as a gate line or a data line must be added or a transformation means for transforming the voltage supplied to one subpixel must be further formed.

To make side visibility close to front visibility, in the case of a liquid crystal display in which one pixel is divided into two subpixels and the voltages applied to the two subpixels are differentiated, luminance is increased in a low gray or a high gray such that the gray expression is difficult at the side and the display quality may be deteriorated. Also, when a transmittance change is not clear according to a gray change of the image signal, the target gray change is not expressed such that the display deterioration may be generated.

Further, to divide a pixel into a plurality of subpixels and allow the subpixels to receive voltages caused by different gamma curves, signal lines such as the gate line or the data line and a corresponding driving circuit must be added, a transformation means such as a switching element for transforming the voltage supplied to the subpixel must be further formed, or a mask must be added to add a pattern. Therefore, the process for manufacturing a display device becomes complicated, and an opening through which the light may pass is made narrower by an additional pattern or an additional switching element so transmittance may be deteriorated.

The above information disclosed in this Background section is only for enhancement of understanding of the background and therefore it may contain information that does not form the prior art that is already known in this country to a person of ordinary skill in the art.

SUMMARY

Embodiments have been made in an effort to provide a display device for simplifying a manufacturing process, improving transmittance and lateral visibility, and clarifying a change of transmittance according to grays, and a driving method thereof.

An exemplary embodiment provides a display device including: a plurality of gate lines each for transmitting a gate signal; a plurality of data lines each for transmitting a data voltage; a first storage line for transmitting a first storage signal of which a voltage level is changed at least once for one frame; and a first pixel connected to a first gate line among the gate lines, a first data line among the data lines, and the first storage line, wherein the first pixel includes first, second, and third subpixels. The first subpixel includes a first switching element connected to the first gate line and the first data line, a first liquid crystal capacitor connected to an output terminal of the first switching element, and a first storage capacitor. The second subpixel includes a second switching element connected to the first gate line and the first data line, a second liquid crystal capacitor connected to an output terminal of the second switching element, and a second storage capacitor. The third subpixel includes a third switching element connected to the first gate line and the first data line, and a third liquid crystal capacitor connected to an output terminal of the third switching element. The first storage capacitor and the second storage capacitor are connected to the first storage line.

The display device further includes a storage line driver for changing the voltage level of the first storage signal applied to the first storage line at least once after the first to third switching elements are turned off.

The voltage level of the first storage signal swings between a first voltage level and a second voltage level with one horizontal period as a period.

The voltage level of the first storage signal rises after the first to third switching elements are turned off in a frame in which the first data line transmits a positive data voltage, and the voltage level of the first storage signal falls after the first to third switching elements are turned off in a frame in which the first data line transmits a negative data voltage.

A changing amount of a charged voltage of the first liquid crystal capacitor is different from a changing amount of a charged voltage of the second liquid crystal capacitor when the voltage level of the first storage signal is changed.

The third subpixel further includes a third storage capacitor connected to a common storage line for transmitting a predetermined voltage for one frame.

The display device further includes a second storage line for transmitting a second storage signal having an opposite waveform to that of the first storage signal.

The display device further includes a second pixel adjacent to the first pixel in a row direction, wherein the second pixel includes fourth, fifth, and sixth subpixels. The fourth subpixel includes a fourth switching element connected to the first gate line and a second data line among the data lines, a fourth liquid crystal capacitor connected to an output terminal of the fourth switching element, and a fourth storage capacitor. The fifth subpixel includes a fifth switching element connected to the first gate line and the second data line, a fifth liquid crystal capacitor connected to an output terminal of the fifth switching element, and a fifth storage capacitor. The sixth subpixel includes a sixth switching element connected to the first gate line and the second data line, and a sixth liquid crystal capacitor connected to an output terminal of the sixth switching element. The fourth storage capacitor and the fifth storage capacitor are connected to the second storage line.

A changing amount of a charged voltage of the fourth liquid crystal capacitor is different from a changing amount of a charged voltage of the fifth liquid crystal capacitor when a voltage level of the second storage signal is changed.

The sixth subpixel further includes a sixth storage capacitor connected to a common storage line for transmitting a predetermined voltage for one frame.

The first storage line and the second storage line are provided on opposite sides with respect to the first gate line.

The display device includes a plurality of pixels connected to the gate lines and the data lines, the gate lines and the pixels are divided into a plurality of blocks, and the display device further includes a plurality of storage transmitting lines for transmitting the first storage signal to the plurality of blocks.

The first storage signals applied to different blocks among the blocks are different from each other, and a same first storage signal is applied to a same block.

After a gate-on voltage is transmitted to all of the gate lines included in one of the blocks, a voltage level of the first storage signal applied to the block is changed.

Another embodiment provides a method for driving a display device, the display device including a plurality of gate lines, a plurality of data lines, a first storage line for transmitting a first storage signal, and a first pixel connected to a first gate line among the gate lines, a first data line among the data lines, and the first storage line, wherein the first pixel includes first, second, and third subpixels. The first subpixel includes a first switching element connected to the first gate line and the first data line, a first liquid crystal capacitor connected to an output terminal of the first switching element, and a first storage capacitor. The second subpixel includes a second switching element connected to the first gate line and the first data line, a second liquid crystal capacitor connected to an output terminal of the second switching element, and a second storage capacitor. The third subpixel includes a third switching element connected to the first gate line and the first data line, and a third liquid crystal capacitor connected to an output terminal of the third switching element. The method includes: transmitting a gate-on voltage to the first gate line and then transmitting a gate-off voltage to the first gate line; and after the gate-off voltage is transmitted to the first gate line, changing a voltage level of the first storage signal applied to the first storage capacitor and the second storage capacitor at least once during a frame.

The voltage level of the first storage signal swings between a first voltage level and a second voltage level with one horizontal period as a period.

The method further includes: transmitting a positive data voltage to the data lines in a first frame; and transmitting a negative data voltage to the data lines in a second frame, wherein in the first frame, the voltage level of the first storage signal rises after the first to third switching elements are turned off, and in the second frame, the voltage level of the first storage signal falls after the first to third switching elements are turned off.

The display device includes a plurality of pixels connected to the gate lines and the data lines, the gate lines and the pixels are divided into a plurality of blocks, the method may further include changing the voltage level of the first storage signal applied to a block of the plurality of blocks after the gate-on voltage is transmitted to all of the gate lines included by the block, the first storage signals applied to different blocks are different from each other, and a same first storage signal is applied to a same block.

According to the embodiments, the process for manufacturing a display device is simplified, transmittance and lateral visibility are improved, and the change of transmittance following the change of grays is further clarified to improve display quality.

DETAILED DESCRIPTION OF THE EMBODIMENTS

Figure 1:
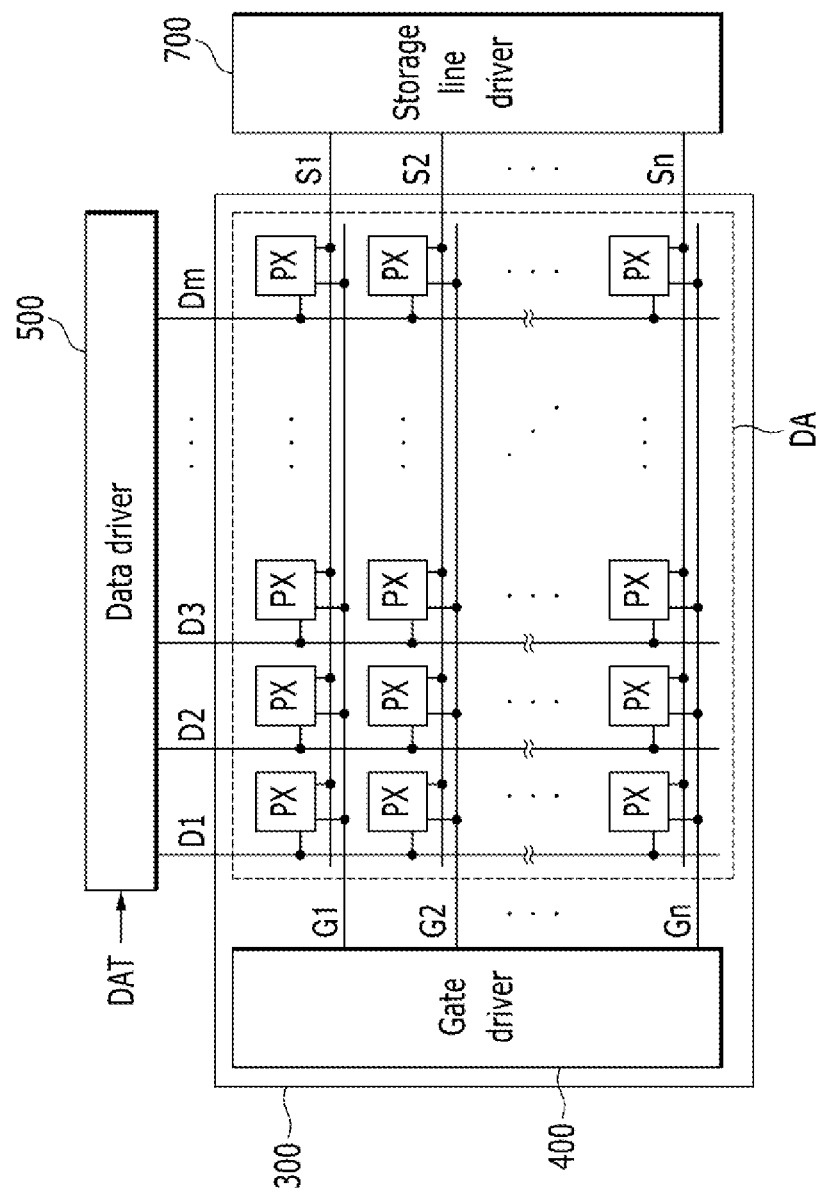
FIG. 1 shows a block diagram of a display device according to an exemplary embodiment.

The inventive concept will be described more fully hereinafter with reference to the accompanying drawings, in which exemplary embodiments are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

A display device according to an exemplary embodiment will now be described with reference to FIG. 1 to FIG. 3.

Referring to FIG. 1, the display device according to an exemplary embodiment includes a display panel 300, a gate driver 400, a data driver 500, and a storage line driver 700.

The display panel 300 may include a display area (DA) in which a plurality of pixels (PX) are provided and which displays an image, and a peripheral area (not shown). In an equivalent circuit manner, the display panel 300 includes a plurality of signal lines (G1-Gn and D1-Dm) and the plurality of pixels (PX) connected thereto and arranged substantially in a matrix form.

The signal lines (G1-Gn and D1-Dm) include a plurality of gate lines (G1-Gn) for transmitting a gate signal, a plurality of data lines (D1-Dm) for transmitting a data voltage, and a plurality of storage line (S1-Sn) for transmitting a storage voltage.

The pixel (PX) includes a plurality of switching elements (not shown) connected to the gate lines (G1-Gn) and the data lines (D1-Dm), and a plurality of subpixel electrodes connected thereto.

Figure 2:
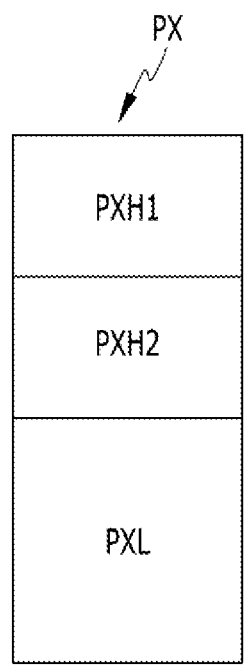
FIG. 2 shows a schematic structure of a pixel of a display device according to an exemplary embodiment.

Referring to FIG. 2, a pixel (PX) includes a first subpixel (PXH1), a second subpixel (PXH2), and a third subpixel (PXL). The first subpixel (PXH1), the second subpixel (PXH2), and the third subpixel (PXL) may display an image according to different gamma curves for a single piece of image data (DAT). For example, for one frame regarding a single piece of image data (DAT), first luminance of the image displayed by the first subpixel (PXH1) may be the highest, second luminance of the image displayed by the second subpixel (PXH2) may be less than or equal to the first luminance, and third luminance of the image displayed by the third subpixel (PXL) may be less than or equal to the second luminance. The display device according to an exemplary embodiment allows the one pixel (PX) to display the image according to different gamma curves to smoothly control the change of transmittance according to the change of grays of the image data (DAT). Further, from the lateral view, a steep change of transmittance caused by the change of grays may be prevented for low grays and high grays so it is possible to express accurate grays in the low grays and the high grays while approaching the lateral visibility to the front visibility.

Areas of the first subpixel (PXH1), the second subpixel (PXH2), and the third subpixel (PXL) may be the same, or the areas of at least two subpixels (of PXH1, PXH2, and PXL) may be different. For example, the areas of the first subpixel (PXH1) and the second subpixel (PXH2) may be substantially the same, and the area of the third subpixel (PXL) may be the largest.

Figure 3:
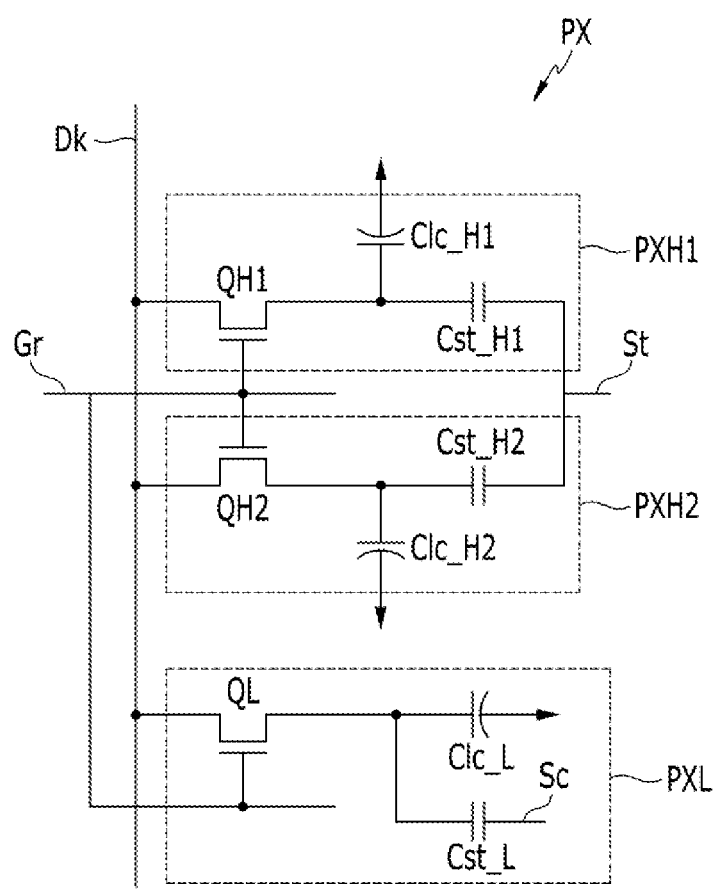
FIG. 3 shows an equivalent circuit diagram of a pixel of a display device according to an exemplary embodiment.

Referring to FIG. 3, the first subpixel (PXH1) includes a first switching element (QH1), a first liquid crystal capacitor (Clc_H1), and a first storage capacitor (Cst_H1), the second subpixel (PXH2) includes a second switching element (QH2), a second liquid crystal capacitor (Clc_H2), and a second storage capacitor (Cst_H2), and the third subpixel (PXL) includes a third switching element (QL), a third liquid crystal capacitor (Clc_L), and a third storage capacitor (Cst_L).

The first switching element (QH1), the second switching element (QH2), and the third switching element (QL) are three-terminal elements such as thin film transistors, a control terminal thereof is connected to the gate line (Gr) (r=1, 2, . . . , n) and an input terminal thereof is connected to a data line (Dk) (k=1, 2, . . . , in). The first switching element (QH1) includes an output terminal connected to the first liquid crystal capacitor (Clc_H1) and the first storage capacitor (Cst_H1), the second switching element (QH2) includes an output terminal connected to the second liquid crystal capacitor (Clc_H2) and the second storage capacitor (Cst_H2), and the third switching element (QL) includes an output terminal connected to the third liquid crystal capacitor (Clc_L) and the third storage capacitor (Cst_L).

The gate line connected to the control terminal of the third switching element (QL) and the gate line connected to the control terminals of the first and second switching elements (QH1) and (QH2) may transmit a same gate signal, they may be connected to each other in the display area (DA) or the peripheral area of the display panel 300, and they are indicated as gate lines (Gr).

The first liquid crystal capacitor (Clc_H1) includes a first subpixel electrode connected to the output terminal of the first switching element (QH1) and receiving a data voltage and an opposed electrode facing the first subpixel electrode as two terminals. The second liquid crystal capacitor (Clc_H2) includes a second subpixel electrode connected to the output terminal of the second switching element (QH2) and receiving a data voltage, and an opposed electrode facing the second subpixel electrode as two terminals. The third liquid crystal capacitor (Clc_L) includes a third subpixel electrode connected to the output terminal of the third switching element (QL) and receiving a data voltage and an opposed electrode facing the third subpixel electrode as two terminals. The opposed electrode may transmit a common voltage (Vcom).

Regarding the liquid crystal display, a liquid crystal layer is provided between the first, second, and third subpixel electrodes and the opposed electrode, and the liquid crystal layer may function as a dielectric material of the first liquid crystal capacitor (Clc_H1), the second liquid crystal capacitor (Clc_H2), and the third liquid crystal capacitor (Clc_L).

The liquid crystal layer may have dielectric anisotropy and may include a plurality of liquid crystal molecules. The liquid crystal molecules may have their long axes aligned to be perpendicular to a surface of the first to third subpixel electrodes or the opposed electrode, to be horizontal thereto, or to be inclined with a pretilt while no electric field is applied.

The first storage capacitor (Cst_H1) includes a terminal connected to the output terminal of the first switching element (QH1) or the first subpixel electrode and a terminal connected to the storage line (St) (t=1, 2, . . . , n). The first storage capacitor (Cst_H1) reinforces maintaining of a charged pixel voltage when the first liquid crystal capacitor (Clc_H1) receives a data voltage through the first switching element (QH1) and is charged with the pixel voltage.

The second storage capacitor (Cst_H2) includes a terminal connected to the output terminal of the second switching element (QH2) or the second subpixel electrode, and a terminal connected to the storage line (St) (t=1, 2, . . . , n). The second storage capacitor (Cst_H2) reinforces maintaining of a charged pixel voltage when the second liquid crystal capacitor (Clc_H2) receives a data voltage through the second switching element (QH2) and is charged with the pixel voltage.

The storage line (St) connected to the first and second storage capacitors (Cst_H1 and Cst_H2) transmits a storage voltage that is variable with respect to time. In detail, the storage voltage may be variable for each frame or for each predetermined time that is less than the frame.

The third storage capacitor (Cst_L) includes a terminal connected to the output terminal of the third switching element (QL) or the third subpixel electrode, and a terminal connected to a common storage line (Sc). The third storage capacitor (Cst_L) reinforces maintaining of a charged pixel voltage when the third liquid crystal capacitor (Clc_L) receives a data voltage through the third switching element (QL) and is charged with the pixel voltage. The common storage line (Sc) may transmit a constant voltage.

According to an exemplary embodiment, capacitance (ClcH1) of the first liquid crystal capacitor (Clc_H1) and capacitance (CstH1) of the first storage capacitor (Cst_H1) included by the first subpixel (PXH1), and capacitance (CcH2) of the second liquid crystal capacitor (Clc_H2) and capacitance (CstH2) of the second storage capacitor (Cst_H2) included by the second subpixel (PXH2), satisfy Equation 1.

$$\frac{CstH1}{(CstH1 + ClcH1 + Cetc1)} > \frac{CstH2}{(CstH2 + ClcH2 + Cetc2)} \quad \text{(Equation 1)}$$

In Equation 1, (Cetc1) is parasitic capacitance at the output terminal of the first switch element (QH1) or the first subpixel electrode, and (Cetc2) is parasitic capacitance at the output terminal of the second switch element (QH2) or the second subpixel electrode.

For example, Equation 1 may be satisfied by making capacitance (ClcH1) of the first liquid crystal capacitor (Clc_H1) different from capacitance (ClcH2) of the second liquid crystal capacitor (Clc_H2) or making capacitance (CstH1) of the first storage capacitor (Cst_H1) different from capacitance (CstH2) of the second storage capacitor (Cst_H2). In detail, Equation 1 may be satisfied when the capacitance (ClcH1) of the first liquid crystal capacitor (ClcH1) is made be less than the capacitance (ClcH2) of the second liquid crystal capacitor (Clc_H2) or the capacitance (CstH1) of the first storage capacitor (Cst_H1) is made be greater than the capacitance (CstH2) of the second storage capacitor (Cst_H2). To achieve this, the areas of the first and second subpixel electrodes that are the terminals of the liquid crystal capacitors (Clc_H1 and Clc_H2) may be controlled or the area of the terminal of the storage capacitor (Cst_H1 and Cst_H2) may be controlled.

Further, in order to realize color expression, each pixel (PX) may express one of primary colors (i.e., a spatial division) or may alternately express the primary colors with respect to time (i.e., a temporal division) so that a desired color may be recognized by a spatial or temporal sum of the primary colors. The primary colors exemplarily include red, green, and blue.

Referring to FIG. 1, the data driver 500 is connected to the data lines (D1-Dm) of the display panel 300. The data driver 500 receives image data (DAT) from a signal controller (not shown), generates a data voltage (Vd) corresponding to the image data (DAT), and applies the same to the data lines (D1-Dm).

A polarity of the data voltage (Vd) with respect to the common voltage (Vcom), referred to as a polarity of the data voltage may be inverted for each of at least one frame, which is called frame inversion. Further, the polarities of the data voltage applied to the neighboring data line (D1-Dm) for one frame may be opposite (i.e., column inversion), and the polarity of the data voltage (Vd) applied to one data line (D1-Dm) may be inverted every at least one row (i.e., row inversion).

The gate driver 400 is connected to the gate lines (G1-Gn) of the display panel 300, and applies a gate signal to the gate lines (G1-Gn) that is a combination of a gate-on voltage (Von) for turning on the switching element and a gate-off voltage (Voff) for turning off the switching element.

The storage line driver 700 is connected to the storage lines (S1-Sn) of the display panel 300, and applies a storage signal (Vs) having a voltage level that is variable with respect to time to the storage lines (S1-Sn). FIG. 1 shows a single storage line (S1-Sn) passing through one pixel row, and differing from this, one pixel row may be connected to a pair of storage lines (not shown) for transmitting different storage signals (Vs).

At least one of the gate driver 400, the data driver 500, and the storage line driver 700 may be directly mounted as at least one IC chip on the display panel 300, may be mounted on a flexible printed circuit film and be attached as a tape carrier package (TCP) to the display panel 300, may be mounted on an additional printed circuit board (PCB) and be connected to the display panel 300, or may be integrated on the display panel 300 with a thin film transistor of the pixel (PX). FIG. 1 shows an example in which the gate driver 400 is integrated on the display panel 300.

A method for driving a display device according to an exemplary embodiment will now be described with reference to FIG. 4 and FIG. 5 together with the above-described FIG. 1 to FIG. 3.

The gate driver 400 applies a gate signal (Vg) to the gate lines (G1-Gn) according to a control signal provided by a signal controller. When a gate-on voltage (Von) is applied to the gate lines (G1-Gn), the first to third switching elements (QH1, QH2, and QL) connected to the gate lines (G1-Gn) are turned on. The data driver 500 applies a data voltage (Vd) to the data line (Di-Dm) according to image data (DAT) and a control signal provided by the signal controller. A polarity of the data voltage (Vd) may be positive or negative with reference to the common voltage (Vcom). The data voltage (Vd) applied to the data lines (D1-Dm) is applied to the first to third subpixel electrodes of the corresponding pixel (PX) through the turned on first to third switching elements (QH1, QH2, and QL).

A difference between the voltage (Vp) of the first to third subpixel electrodes and the common voltage (Vcom) is shown as a charged voltage of the first to third liquid crystal capacitors (Clc_H1, Clc_H2, and Clc_L), that is, a pixel voltage. In the case of the liquid crystal display, the liquid crystal molecules have different arrangements according to the pixel voltage, and a polarization or phase delay value of the light passing through the liquid crystal layer may be changed. The change of polarization is shown as the change of transmittance of the light by a polarizer so the pixel (PX) may show the image with luminance indicated by the gray of the image data (DAT).

Figure 4:
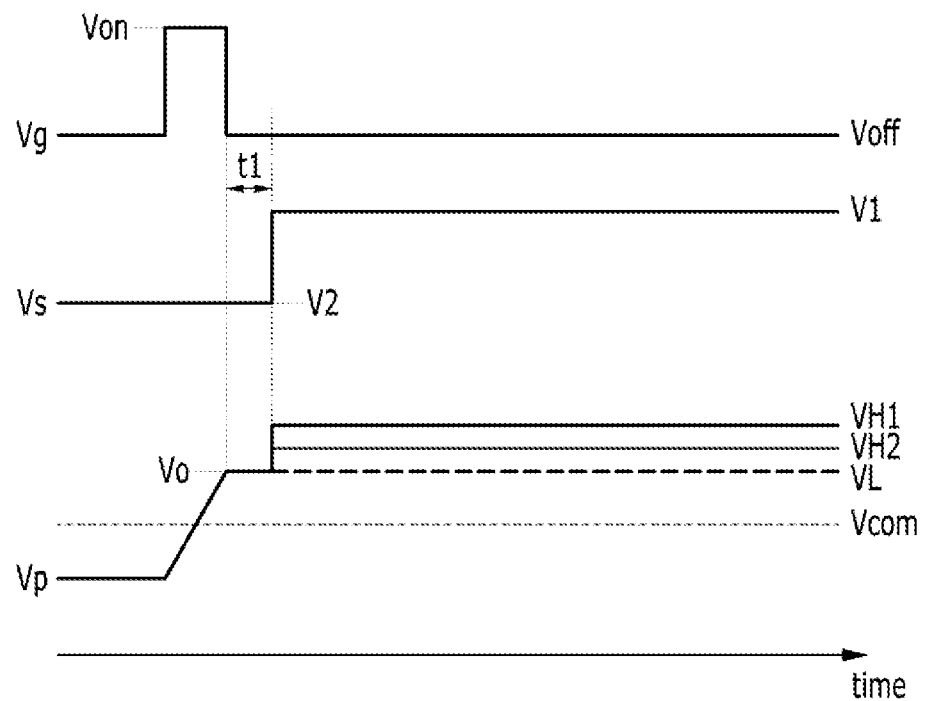
FIG. 4 and FIG. 5 show timing diagrams for showing a driving signal applied to a pixel of a display device according to an exemplary embodiment and a 10) corresponding change of a voltage of a subpixel electrode.

Referring to FIG. 4, when the data voltage (Vd) is positive and while the first to third switching elements (QH1, QH2, and QL) are turned on, the voltage (Vp) at the first to third subpixel electrodes is increased to reach a voltage (Vo).

The storage line driver 700 changes a voltage level of the storage signal (Vs) applied to the storage lines (S1-Sn) when the gate-off voltage (Voff) is applied to the gate lines (G1-Gn) or after a predetermined time t1 when the same is applied thereto. In the frame having a positive data voltage (Vd), the storage signal (Vs) may be changed to a high level (V1) from a low level (V2). A voltage difference between the low level (V2) and the high level (V), that is, a swing width of the storage signal (Vs), may be substantially 2 V to 3 V, and without being restricted to this, it is appropriately variable depending on a condition for manufacturing the display device.

When the storage signal (Vs) is changed to the high level (V1) from the low level (V2), the voltage (Vp) at the floating first and second subpixel electrodes rises by a predetermined magnitude according to capacitive coupling through the first and second storage capacitors (Cst_H1 and Cst_H2). Particularly, as described above, a voltage increasing value of the first subpixel electrode is greater than a voltage increasing value of the second subpixel electrode in a display device according to an exemplary embodiment satisfying Equation 1. Resultantly, the voltage (VH1) at the first subpixel electrode becomes greater than the voltage (VH2) at the second subpixel electrode. The voltage (VH1) of the first subpixel electrode and the voltage (VH2) of the second subpixel electrode are positive, and the voltage (VH1) of the first subpixel electrode and the voltage (VH2) of the second subpixel electrode until a next frame begins after the storage signal (Vs) rises to the high level (V) may be determined by Equation 2.

$$VH1 = Vo + \frac{CstH1}{(CstH1 + ClcH1 + Cetc1)} \times (V1 - V2) \quad \text{(Equation 2)}$$

$$VH2 = Vo + \frac{CstH2}{(CstH2 + ClcH2 + Cetc2)} \times (V1 - V2)$$

By Equation 1 and Equation 2, the voltage (VH1) of the first subpixel electrode is greater than the voltage (VH2) of the second subpixel electrode until the next frame starts after the storage signal (Vs) increases to reach the high level (V1).

On the contrary, a constant voltage may be applied to the third storage capacitor (Cst_L) of the third subpixel (PXL), and a voltage (VL) at the third subpixel electrode may be substantially equal to the voltage (Vo) until the corresponding frame ends.

Therefore, the first to third subpixels (PXH1, PXH2, and PXL) receive the same data voltage (Vd) at the same time, and are charged with substantially the same voltage (Vo), and pixel voltages of the first to third subpixels (PXH1, PXH2, and PXL) become different from each other according to a change of the storage signal (Vs). In detail, when the data voltage (Vd) is positive, the voltage (VH1) of the first subpixel electrode, the voltage (VH2) of the second subpixel electrode, and the voltage (VL) of the third subpixel electrode are reduced in order as shown in FIG. 4. Accordingly, the differences between the voltages (VH1, VH2, and VL) of the first to third subpixel electrodes until the next frame begins after the storage signal (Vs) increases to the high level (V1) and the common voltage (Vcom), that is, the pixel voltage of the first subpixel (PXH1), the pixel voltage of the second subpixel (PXH2), and the pixel voltage of the third subpixel (PXL), are reduced in the order. When the pixel voltages of the first to third subpixels (PXH1, PXH2, and PXL) are appropriately controlled, the image viewed from the lateral side of the display panel 300 may be controlled to be mostly close to the image viewed from the front side thereof. That is, lateral visibility may be improved by mostly approaching the lateral-side gamma curve to the front-side gamma curve.

Further, according to the present exemplary embodiment, a number of gamma curves of the image displayable by one pixel (PX) for one frame may be greater than 3 so the change of transmittance caused by the change of grays may be further accurately expressed and lateral visibility may be further improved. In addition, there is no need to include an additional pattern, an additional switching element, and an additional driving circuit in a like manner of the conventional art to express the image caused by at least three gamma curves so the opening of the pixel (PX) is not reduced to improve transmittance, and there is no need to add a mask to reduce the number of processes and the cost for manufacturing a display device.

Also, the voltages of the first and second subpixel electrodes may be increased to be greater than the positive data voltage (Vd) because of the increase of the voltage level of the storage signal (Vs) so a driving voltage (AVDD) may be set to be low thereby reducing power consumption and heating of the display device.

For each 1 horizontal period (1H), a gate-on voltage (Von) is supplied to the gate lines (G1-Gn) and all pixels (PX) are charged with a target pixel voltage to display a one-frame image.

When the one frame is over, the next frame starts and an inversion signal applied to the data driver 500 is controlled (i.e., frame inversion) so that the polarity of the data voltage (Vd) may be switched to be opposite to the polarity of the previous frame.

Figure 5:
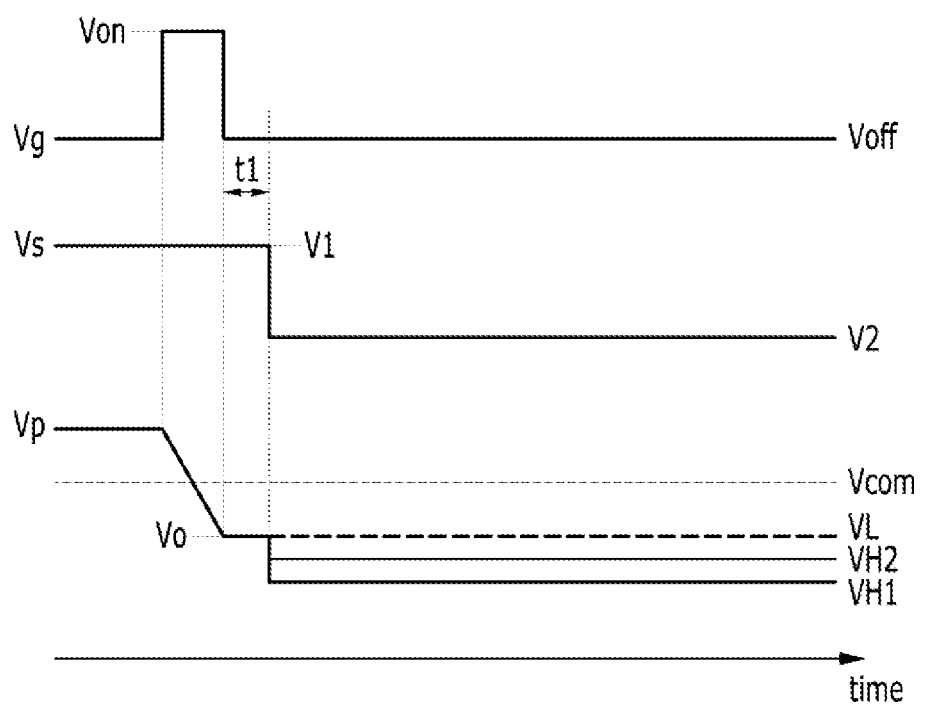

Referring to FIG. 5, a method for driving a display device according to an exemplary embodiment mostly corresponds to the driving method described with reference to FIG. 4, but the data voltage (Vd) is negative and the change of the voltage (Vp) of the subpixel electrode is different.

While the first to third switching elements (QH1, QH2, and QL) are turned on, the charged voltages of the first to third liquid crystal capacitors (Clc_H1, Clc_H2, and Clc_L), that is, the pixel voltages, fall to reach the negative voltage (Vo).

The storage line driver 700 changes the voltage level of the storage signal (Vs) applied to the storage lines (S1-Sn) to the low level (V2) from the high level (V1) just when a gate-off voltage (Voff) is applied to the gate line (G11-Gn) or after a predetermined time t1 after the gate-off voltage (Voff) is applied thereto.

When the storage signal (Vs) is changed from the high level (V1) to the low level (V2), the voltage (Vp) of the first and second subpixel electrodes falls by a predetermined magnitude. Particularly, as described above, a voltage decreasing value of the first subpixel electrode is greater than a voltage decreasing value of the second subpixel electrode in a display device according to an exemplary embodiment satisfying Equation 1. As a result, the voltage (VH1) of the first subpixel electrode becomes less than the voltage (VH2) of the second subpixel electrode. The voltage (VH1) of the first subpixel electrode and the voltage (QH2)

of the second subpixel electrode are negative, and the voltage (VH1) of the first subpixel electrode and the voltage (VH2) of the second subpixel electrode until the next frame begins after the voltage level of the storage signal (Vs) falls to the low level (V2) may be determined by Equation 2.

The voltage (VH1) of the first subpixel electrode is less than the voltage (VH2) of the second subpixel electrode until the frame begins after the voltage level of the storage signal (Vs) falls to the low level (V2) by Equation 1 and Equation 2.

On the contrary, a constant voltage may be applied to the third storage capacitor (Cst_L) of the third subpixel (PXL), and the voltage (VL) at the third subpixel electrode may be substantially equal to the voltage (Vo) until the corresponding frame ends.

Therefore, when the data voltage (Vd) is negative, the voltage (VH1) of the first subpixel electrode, the voltage (VH2) of the second subpixel electrode, and the voltage (VL) of the third subpixel electrode are increased in order as shown in FIG. 5. Accordingly, the differences between the voltages (VH1, VH2, and VL) of the first to third subpixel electrodes and the common voltage (Vcom), that is, the pixel voltage of the first subpixel (PXH1), the pixel voltage of the second subpixel (PXH2), and the pixel voltage of the third subpixel (PXL), are reduced in order until the next frame begins after the voltage level of the storage signal (Vs) falls to the low level (V2), and by controlling them in an appropriate manner, lateral visibility may be improved.

Further, according to the present exemplary embodiment, a number of gamma curves of the image displayable by one pixel (PX) for one frame may be greater than 3 so the change of transmittance caused by the change of grays may be further accurately expressed and lateral visibility may be further improved. In addition, there is no need to include an additional pattern, an additional switching element, and an additional driving circuit in a like manner of the conventional art to express the image caused by at least three gamma curves so the opening of the pixel (PX) is not reduced to improve transmittance, and there is no need to add a mask to reduce the number of processes and the cost for manufacturing a display device.

Also, the voltages of the first and second subpixel electrodes may be decreased to be less than the negative data voltage (Vd) because of the decrease of the voltage level of the storage signal (Vs) so a driving voltage (AVDD) may be set to be low thereby reducing power consumption and heating of the display device.

A method for driving a display device according to an exemplary embodiment will now be described with reference to FIG. 6 and FIG. 7.

Figure 6:
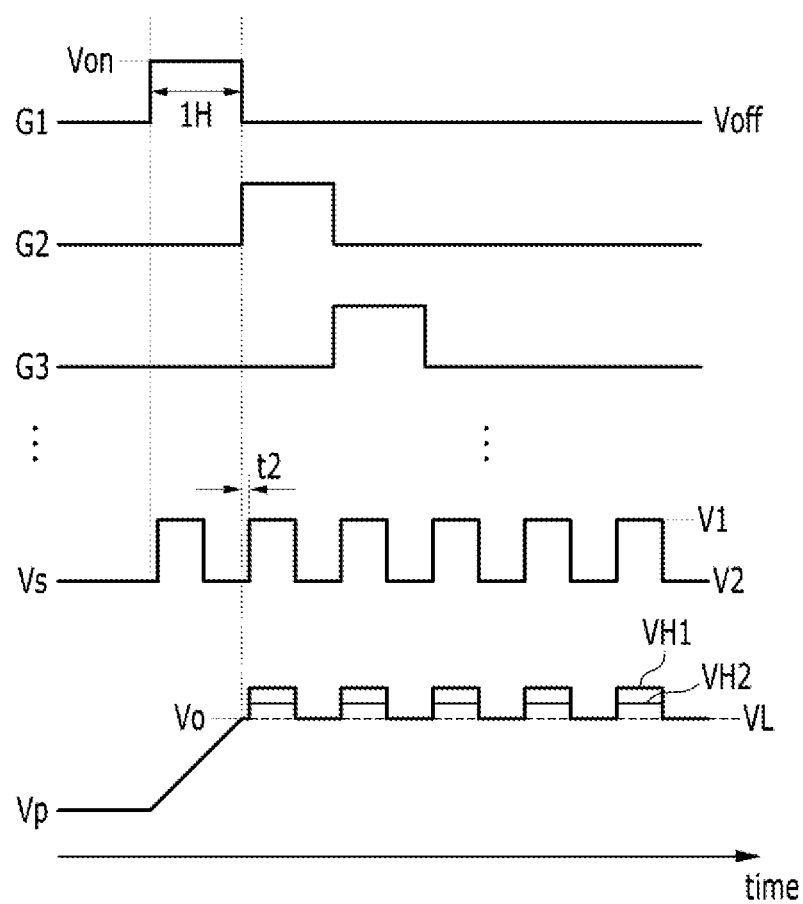
FIG. 6 and FIG. 7 show timing diagrams of a driving signal applied to a pixel of a display device according to an exemplary embodiment and a corresponding change of a voltage of a subpixel electrode.

Referring to FIG. 6, the method for driving a display device according to an exemplary embodiment mostly corresponds to the driving method described with reference to FIG. 4, and a changed waveform of the storage signal (Vs) may be different. According to the present exemplary embodiment, the gate-off voltage (Voff) is applied to the gate lines (G1-Gn) connected to the pixels (PX) of each row, the storage signal (Vs) of the storage lines (S1-Sn) connected to the corresponding pixel (PX) is changed to the high level (V1) from the low level (V2), and the storage signal (Vs) may then swing between the high level (V1) and the low level (V2) with the one horizontal period 1H as a period. A level changing time of the storage signal (Vs) may be synchronized after a predetermined time t2 after the gate signal (Vg) applied to the gate lines (G1-Gn) falls to the gate-off voltage (Voff) from the gate-on voltage (Von). The predetermined time t2 may be greater than 0 and less than half a horizontal period H/2.

When the data voltage (Vd) is positive, the first to third switching elements (QH1, QH2, are QL) are turned off, and when the storage signal (Vs) rises to the high level (V1) after a predetermined time (t) and then swings, the voltages (Vp) of the first and second subpixel electrodes rise to a predetermined magnitude and then swing between the rising level and the voltage (Vo). As described above, when the storage signal (Vs) rises to the high level (V1) by Equation 1 and Equation 2, the voltage increasing value of the first subpixel electrode is greater than the voltage increasing value of the second subpixel electrode so an increasing level of the voltage (VH1) of the first subpixel electrode is greater than an increasing level of the voltage (VH2) of the second subpixel electrode. The swing period of the voltage (VH1) of the first subpixel electrode and the voltage (VH2) of the second subpixel electrode may be substantially one horizontal period in a like manner of the swing period of the storage signal (Vs).

Accordingly, the first subpixel (PXH1) may display an image with luminance corresponding to a temporal average of the voltage (VH1) of the first subpixel electrode, that is, an intermediate value between the increasing level and the voltage (Vo), until the corresponding frame ends after the first to third switching elements (QH1, QH2, and QL) are turned off, and the second subpixel (PXH2) may display an image with luminance corresponding to a temporal average of the voltage (VH2) of the second subpixel electrode, that is, an intermediate value between the increasing level and the voltage (Vo). Therefore, average luminance of the first subpixel (PXH1) may be greater than average luminance of the second subpixel (PXH2) in the corresponding frame.

On the contrary, a constant voltage may be continuously applied to the third storage capacitor (Cst_L) of the third subpixel (PXL), and the voltage (VL) of the third subpixel electrode may substantially correspond to the voltage (Vo) until the corresponding frame ends.

Therefore, when the data voltage (Vd) is positive, the voltage (VL) of the third subpixel electrode, the temporal average of the voltage (VH2) of the second subpixel electrode, and the temporal average of the voltage (VH1) of the first subpixel electrode are increased in order for one frame as shown in FIG. 6. Accordingly, the differences between the voltages (VH1, VH2, and VL) of the first to third subpixel electrodes and the common voltage (Vcom), that is, the pixel voltage of the third subpixel (PXL), the pixel voltage of the second subpixel (PXH2), and the pixel voltage of the first subpixel (PXH1), are increased in order until the next frame begins after the gate-off voltage (Voff) is applied to the gate lines (G1-Gn) connected to the pixel (PX) of one row, and by appropriately controlling them, lateral visibility may be improved.

According to another exemplary embodiment, differing from FIG. 6, a time for applying a gate-on voltage (Von) to the gate lines (G1-Gn) partly overlaps another to further obtain a time for charging the data voltage (Vd). For example, a time for applying a gate-on voltage (Von) to the second gate line (G2) may begin earlier to overlap a section in which the gate-on voltage (Von) is applied to the first gate line (G1).

Figure 7:
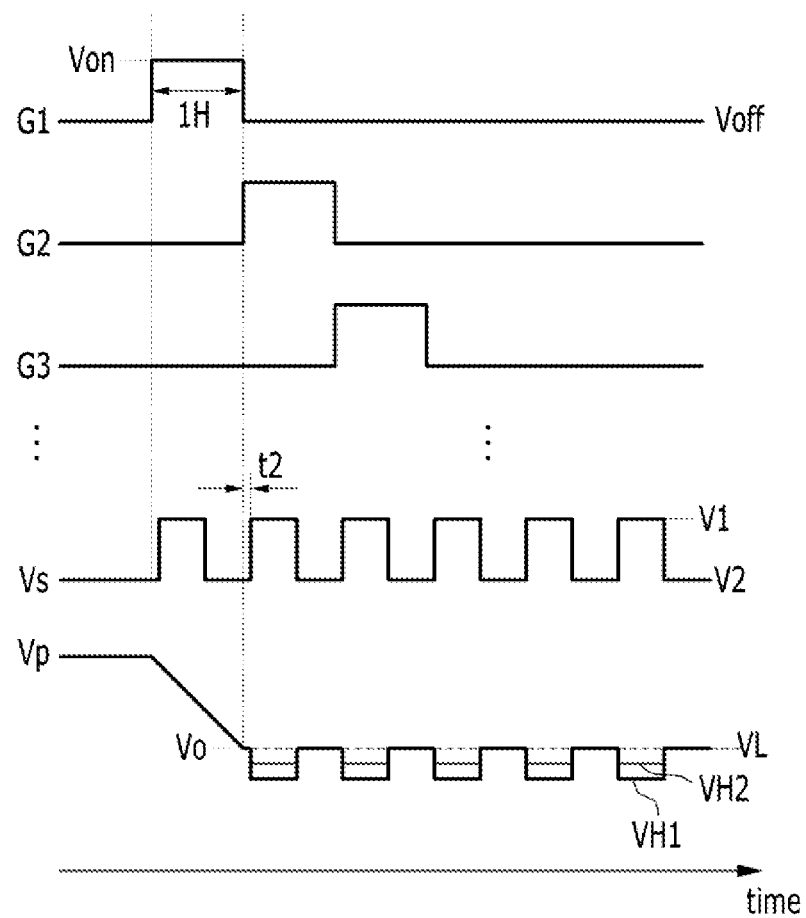

Referring to FIG. 7, the method for driving a display device according to an exemplary embodiment mostly corresponds to the driving method described with reference to FIG. 5, and a changed waveform of the storage signal (Vs) may be different. According to the present exemplary embodiment, the gate-off voltage (Voff) is applied to the gate lines (G1-Gn) connected to the pixel (PX) of each row, the storage signal (Vs) of the storage lines (S1-Sn) connected to the corresponding pixel (PX) is changed to the low level (V2) from the high level (V1), and the storage signal (Vs) may then swing between the high level (V1) and the low level (V2) with the one horizontal period 1H as a period. A level changing time of the storage signal (Vs) may be synchronized after a predetermined time t2 after the gate signal (Vg) applied to the gate lines (G1-Gn) falls to the gate-off voltage (Voff) from the gate-on voltage (Von). The predetermined time t2 may be greater than 0 and less than half a horizontal period H/2.

When the data voltage (Vd) is negative, the first to third switching elements (QH1, QH2, are QL) are turned off, and when the storage signal (Vs) falls to the low level (V2) after a predetermined time (t) and then swings, the voltages (Vp) of the first and second subpixel electrodes fall to a predetermined magnitude and then swing between the falling level and the voltage (Vo). As described above, when the storage signal (Vs) falls to the low level (V2) by Equation 1 and Equation 2, the voltage decreasing value of the first subpixel electrode is greater than the voltage decreasing value of the second subpixel electrode so a decreasing level of the voltage (VH1) of the first subpixel electrode is greater than a decreasing level of the voltage (VH2) of the second subpixel electrode. The swing period of the voltage (VH1) of the first subpixel electrode and the voltage (VH2) of the second subpixel electrode may be substantially one horizontal period in a like manner of the swing period of the storage signal (Vs).

Accordingly, the first subpixel (PXH1) may display an image with luminance corresponding to a temporal average of the voltage (VH1) of the first subpixel electrode, that is, an intermediate value between the decreasing level and the voltage (Vo), until the corresponding frame ends after the first to third switching elements (QH1, QH2, and QL) are turned off, and the second subpixel (PXH2) may display an image with luminance corresponding to a temporal average of the voltage (VH2) of the second subpixel electrode, that is, an intermediate value between the decreasing level and the voltage (Vo). Therefore, average luminance of the first subpixel (PXH1) may be greater than average luminance of the second subpixel (PXH2) in the corresponding frame.

On the contrary, a constant voltage may be continuously applied to the third storage capacitor (Cst_L) of the third subpixel (PXL), and the voltage (VL) of the third subpixel electrode may substantially correspond to the voltage (Vo) until the corresponding frame ends.

Therefore, when the data voltage (Vd) is negative, the voltage (VL) of the third subpixel electrode, the temporal average of the voltage (VH2) of the second subpixel electrode, and the temporal average of the voltage (VH1) of the first subpixel electrode are decreased in order for one frame as shown in FIG. 7. Accordingly, the differences between the voltages (VH1, VH2, and VL) of the first to third subpixel electrodes and the common voltage (Vcom), that is, the pixel voltage of the third subpixel (PXL), the pixel voltage of the second subpixel (PXH2), and the pixel voltage of the first subpixel (PXH1), are increased in order until the next frame begins after the gate-off voltage (Voff) is applied to the gate lines (G1-Gn) connected to the pixel (PX) of one row, and by appropriately controlling them, lateral visibility may be improved.

A display device according to an exemplary embodiment and a driving method thereof will now be described with reference to FIG. 8 and FIG. 9 together with the above-described drawings.

Figure 8:
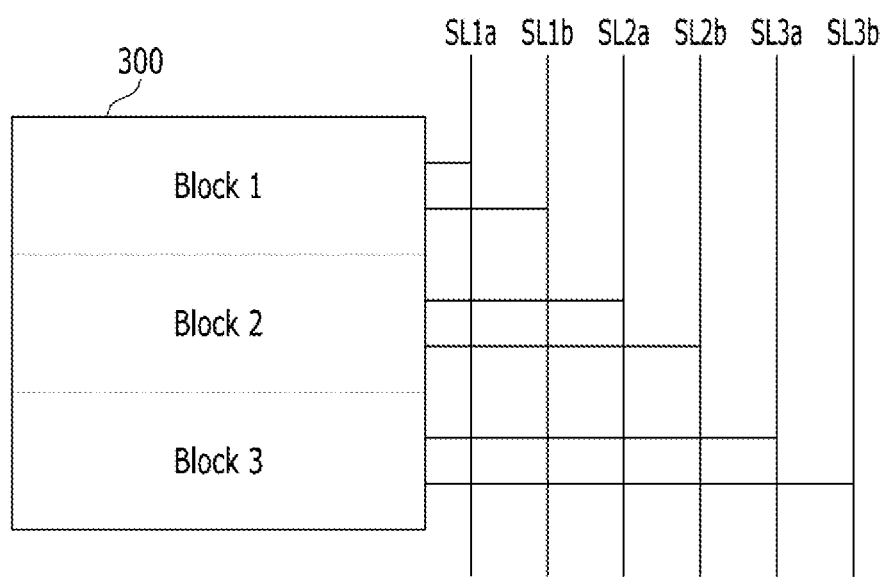
FIG. 8 shows a plurality of blocks included by a display device according to an exemplary embodiment and a storage signal line connected to each block.

Referring to FIG. 8, the display device according to an exemplary embodiment mostly corresponds to the display device described with reference to FIG. 1 to FIG. 3, and the display panel 300 may be divided into a plurality of blocks (block 1, block 2, 5 and block 3). FIG. 8 shows an example in which there are three blocks (block 1, block 2, and block 3), and the number of blocks (block 1, block 2, and block 3) is not limited thereto. The number of blocks (block 1, block 2, and block 3) is appropriately controllable according to a response speed of the display panel 300. Particularly, as the response speed of the display panel 300 becomes slow, the number of blocks may be decreased.

Regarding the display device according to an exemplary embodiment, the respective blocks (block 1, block 2, and block 3) may independently receive a storage signal (Vs). Referring to FIG. 8, the first block (block 1) receives a storage signal (Vs) from storage transmitting lines (SL1a and SL1b), the second block (block 2) receives a storage signal (Vs) from storage transmitting lines (SL2a and SL2b), and the third block (block 3) receives a storage signal (Vs) from storage transmitting lines (SL3a and SL3b). The storage transmitting lines connected to the respective blocks (block 1, block 2, and block 3) and transmitting the storage signals may include a pair of storage transmitting lines (SL1a, SL1b, SL2a, SL2b, SL3a, and SL3b).

One of a pair of storage transmitting lines (SL1a, SL1b, SL2a, SL2b, SL3a, and SL3b) connected to the blocks (block 1, block 2, and block 3) may transmit a storage signal (Vs) to the pixel (PX) for receiving the positive data voltage (Vd), and the other thereof may transmit the storage signal (Vs) to the pixel (PX) for receiving the negative data voltage (Vd).

Figure 9:
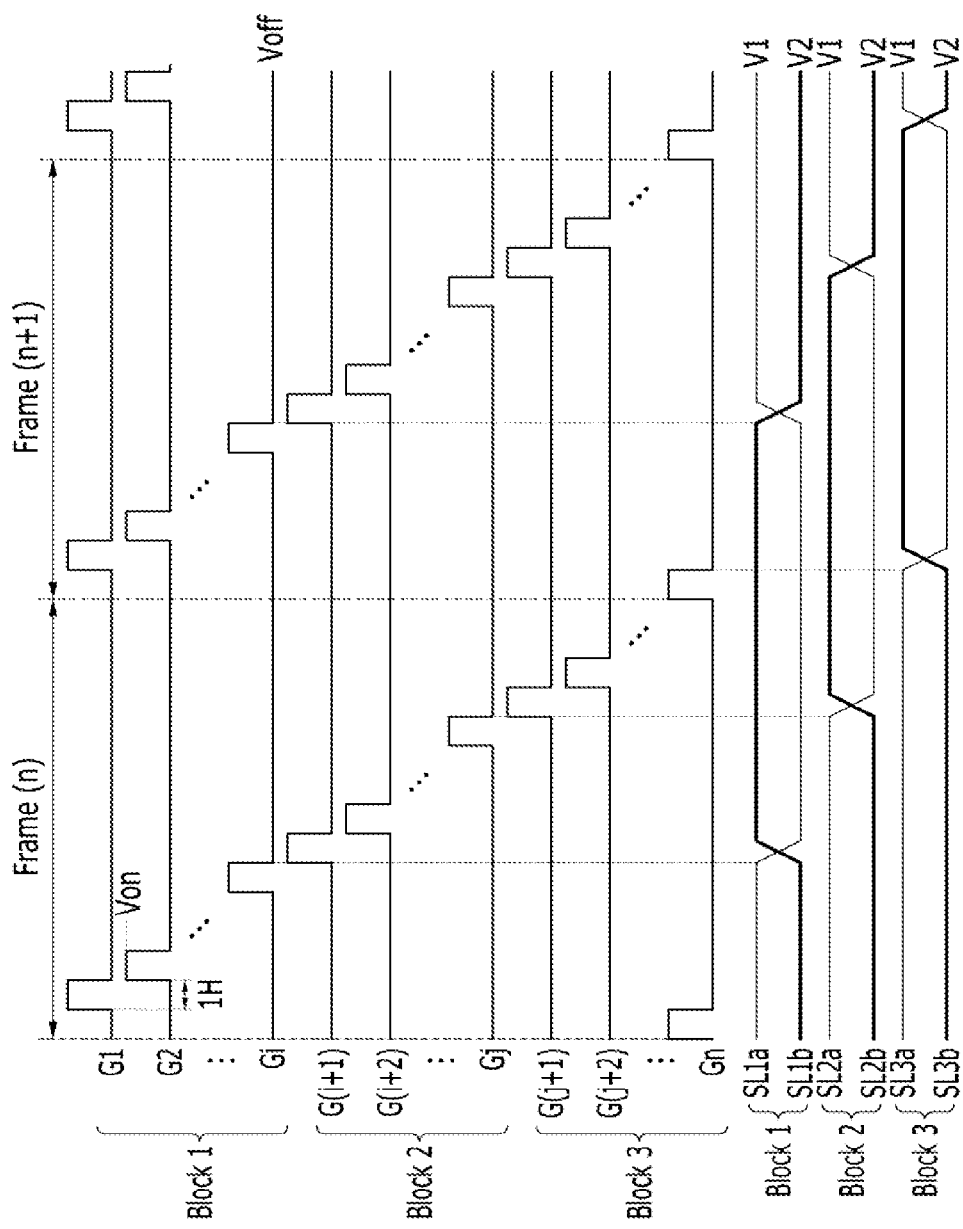
FIG. 9 shows a timing diagram for showing a gate signal and a storage signal applied to a pixel of a display device according to an exemplary embodiment.

Referring to FIG. 9, when the display panel 300 is divided into three blocks (block 1, block 2, and block 3), the pixel (PX) of the first block (block 1) may be connected to the gate line (G1-Gi), the pixel (PX) of the second block (block 2) may be connected to the gate line (G(i+1)–Gj), and the pixel (PX) of the third block (block 3) may be connected to the gate line (G(j+1)–Gn) (i and j are natural numbers with i<j<n). The gate-on voltage (Von) is applied to the pixel (PX) of the first block (block 1), the gate-off voltage (Voff) is applied thereto, and the voltage level of the storage signal (Vs) transmitted by the storage transmitting lines (SL1a and SL1b) is changed so the pixel voltages of the first and second subpixels (PXH1 and PXH2) are changed as described above. The gate-on voltage (Von) is applied to the pixel (PX) of the second block (block 2), the gate-off voltage (Voff) is applied thereto, and the voltage level of the storage signal (Vs) transmitted by the storage transmitting lines (SL2a and SL2b) is changed so the pixel voltages of the first and second subpixels (PXH1) and (PXH2) are changed. The gate-on voltage (Von) is applied to the pixel (PX) of the third block (block 3), the gate-off voltage (Voff) is applied thereto, and the voltage level of the storage signal (Vs) transmitted by the storage transmitting lines (SL3a and SL3b) is changed so the pixel voltages of the first and second subpixels (PXH1 and PXH2) are changed.

For example, in a single frame (frame(n)), the pixel (PX) connected to the storage transmitting line (SL1a) connected to the first block (block 1) receives the negative data voltage (Vd) when receiving the gate-on voltage (Von), the storage signal (Vs) of the storage transmitting line (SL1a) is changed to the low level (V2) from the high level (V1), and the voltages of the first and second subpixel electrodes fall to reach different values so the pixel voltages may be differently increased. In a like manner, in a single frame (frame(n)), the pixel (PX) connected to the storage transmitting line (SL1b) connected to the first block (block 1) receives the positive data voltage (Vd) when receiving the gate-on voltage (Von), the storage signal (Vs) of the storage transmitting line (SL1b) is changed to the high level (V1) from the low level (V2), and the voltages of the first and second subpixel electrodes rise to reach different values so the pixel voltages may be differently increased.

The storage signals (Vs) transmitted by a pair of storage transmitting lines (SL1a, SL1b, SL2a, SL2b, SL3a, and SL3b) connected to one of the blocks (block 1, block 2, and block 3) may be inverted with each other.

Differing from FIG. 9, the storage signal (Vs) may swing with a constant period (e.g., 1 horizontal period) as shown in FIG. 6 and FIG. 7.

A detailed configuration of a display device according to an exemplary embodiment will now be described with reference to FIG. 10 to FIG. 12 together with the above-described drawings.

The display device includes, as a liquid crystal display, a lower panel 100 and an upper panel 200 facing each other, and a liquid crystal layer 3 provided between the display panels 100 and 200.

Regarding the lower panel 100, a gate conductor including a first gate line 121a, a second gate line 121b, a first storage line 131a, a second storage line 131b, and a third storage line 131c is formed on a substrate 110.

The first and second gate lines 121a and 121b may be mainly extended in a horizontal direction. The first and second gate lines 121a and 121b may be connected to each other as shown in FIG. 12, and may transmit a same gate signal.

The first gate line 121a includes a plurality of first gate electrodes 124H1 and a plurality of second gate electrodes 124H2, and the second gate line 121b includes a plurality of third gate electrodes 124L. The first gate electrode 124H1 and the second gate electrode 124H2 neighboring each other on one of the pixels (Px1 and Px2) may be connected to each other.

The first to third storage lines 131a, 131b, and 131c may be extended in parallel with the first and second gate lines 121a and 121b. The first storage line 131a may be provided to be on an opposite side of the second storage line 131b with respect to the first gate line 121a. In the present exemplary embodiment, the first storage line 131a may be provided above the first gate line 121a and the second storage line 131b may be provided below the first gate line 121a. The third storage line 131c may be provided between the second storage line 131b and the second gate line 121b.

The first storage line 131a may include a plurality of first storage electrodes 137a protruded downward, and the second storage line 131b may include a plurality of second storage electrodes 137b protruded in an opposite protruded direction of the first storage electrodes 137a, that is, protruded upward. The first and second storage electrodes 137a and 137b may be protruded toward the first and second gate electrodes 124H1 and 124H2 included by the neighboring first gate line 121a.

The plurality of first storage electrodes 137a and the plurality of second storage electrodes 137b may be alternately arranged for each pixel (PX) in a row direction. That is, when the first storage electrode 137a is provided on the first pixel (PX1), the second storage electrode 137b may be provided on the second pixel (PX2) neighboring the first pixel (PX1) in the row direction.

Figure 12:
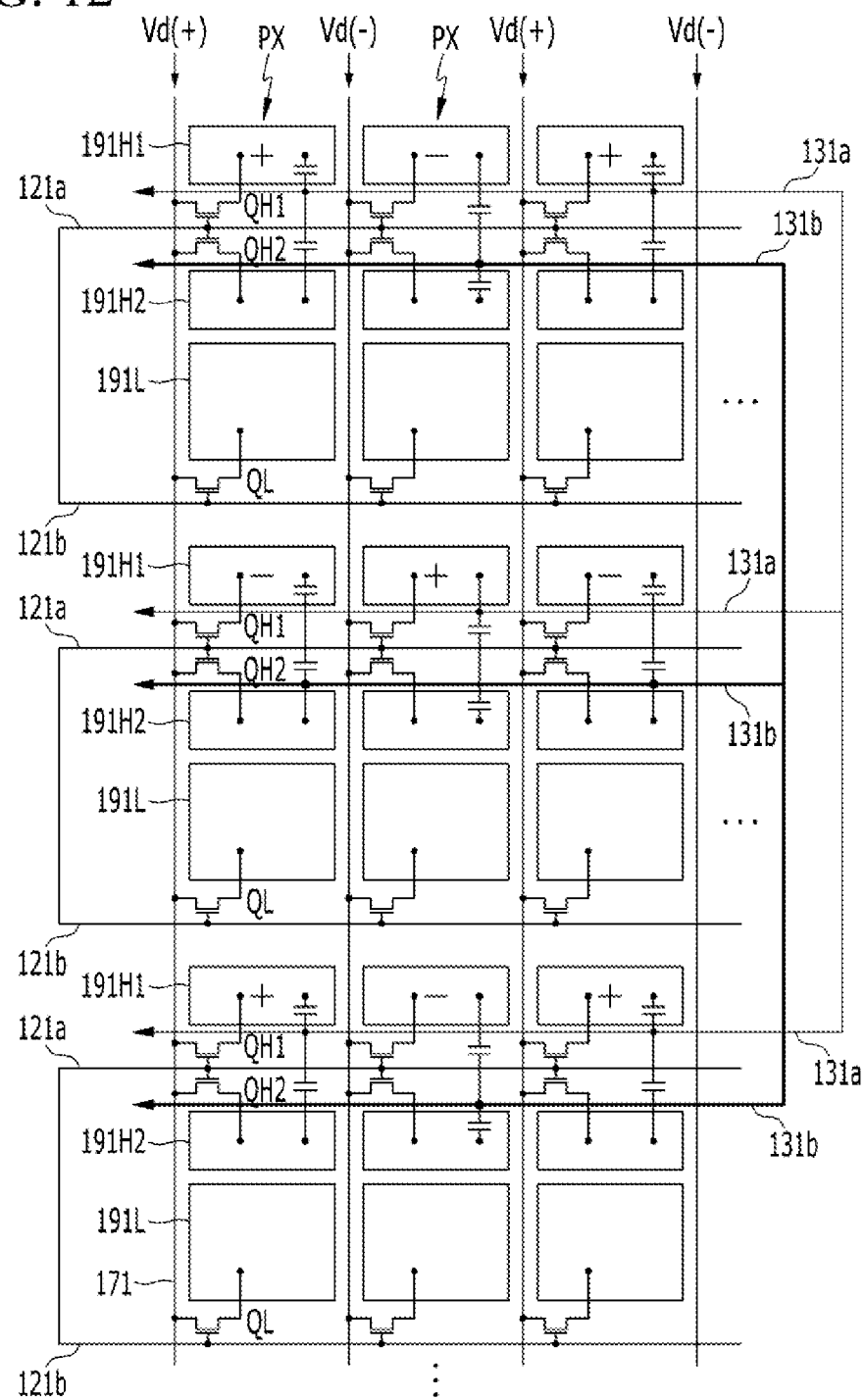
FIG. 12 shows a layout view of a pixel electrode and a signal line included by a display device according to an exemplary embodiment.

Referring to FIG. 12, as described above, the first storage lines 131a connected to the pixel (PX) provided in one of the blocks (block 1, block 2, and block 3) may be connected to each other to transmit the same storage signal (Vs), and the second storage lines 131b may be connected to each other to transmit the same storage signal (Vs).

A waveform of the storage signal (Vs) transmitted by the first storage line 131a may be an inverted form of the waveform of the storage signal (Vs) transmitted by the second storage line 131b. That is, when the storage signal (Vs) transmitted by the first storage line 131a rises to the high level (V1) from the low level (V2), the storage signal (Vs) transmitted by the second storage line 131b may fall to the low level (V2) from the high level (V).

The third storage line 131c may correspond to the above-described conmmon storage line (Sc) and may transmit a constant voltage.

Figure 10:
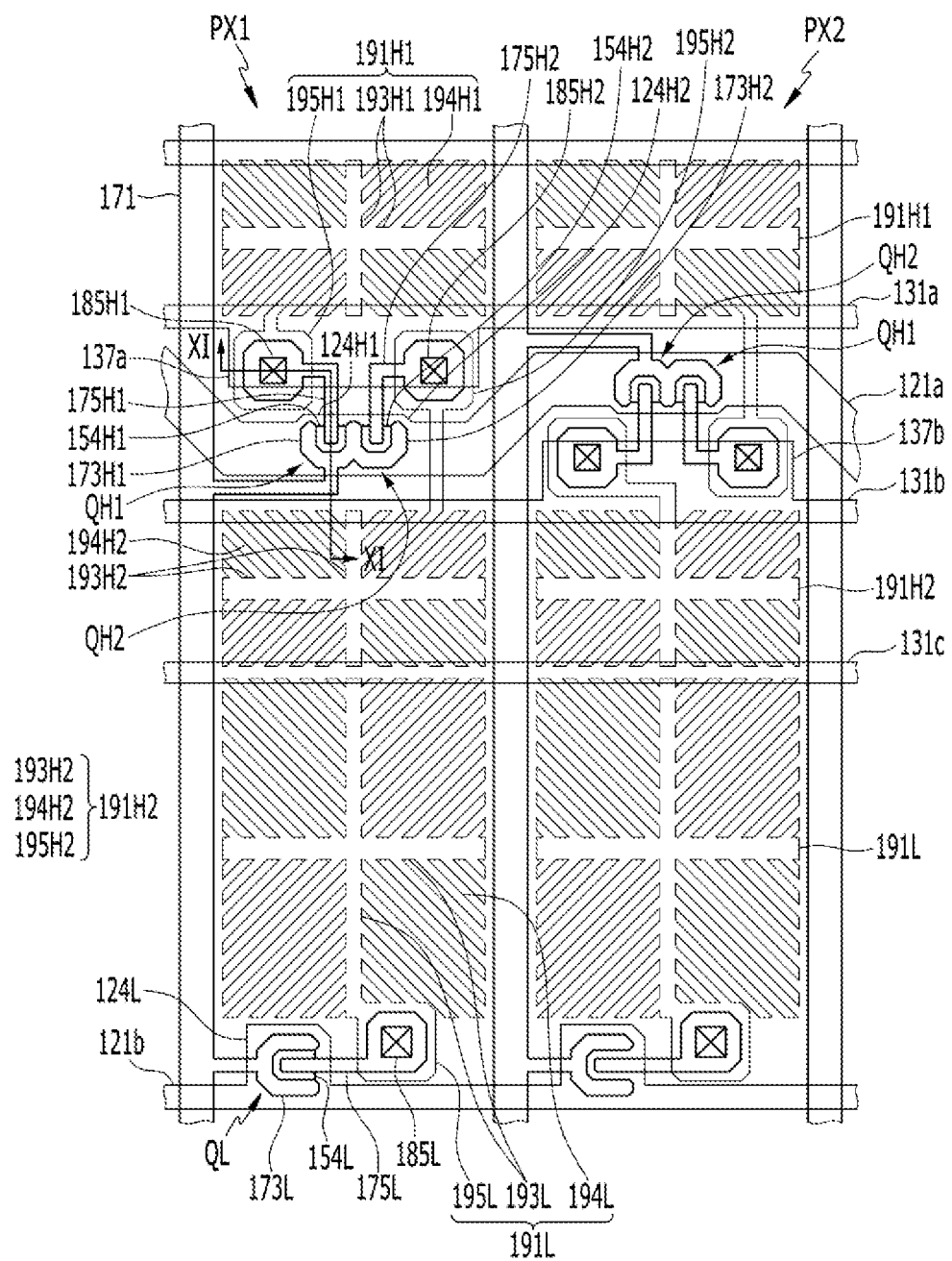
FIG. 10 shows a layout view of two pixels of a display device according to an exemplary embodiment.
Figure 11:
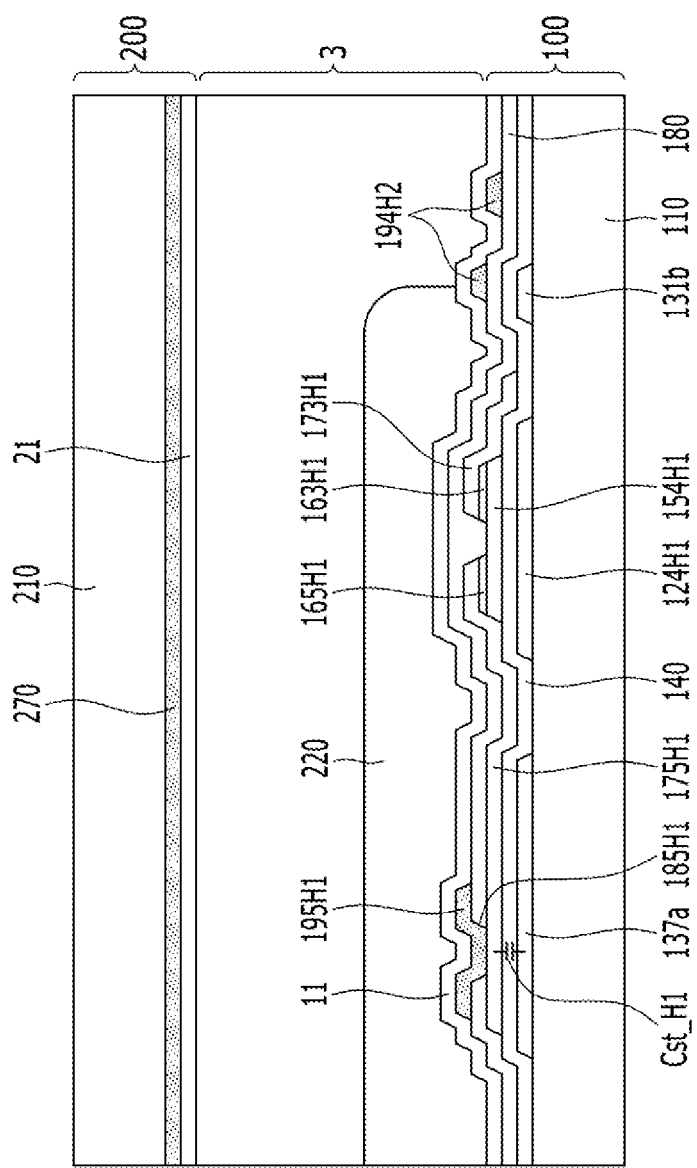
FIG. 11 shows a cross-sectional view of a display device of FIG. 10 with respect to a line XI-XI.

Referring to FIG. 10 and FIG. 11, a gate insulating layer 140 is provided on the gate conductor, and a plurality of semiconductors 154H1, 154H2, and 154L are provided thereon. The semiconductors 154H1, 154H2, and 154L may be provided on the first gate electrode 124H1, the second gate electrode 124H2, and the third gate electrode 124L, respectively.

A plurality of ohmic contacts 163H1 and 165H1 may be provided on the semiconductors 154H1, 154H2, and 154L.

A data conductor including a plurality of data lines 171, a first drain electrode 175H1, a second drain electrode 175H2, and a third drain electrode 175L is formed on ohmic contacts 163H1 and 165H1 and the gate insulating layer 140.

The data line 171 includes a plurality of first source electrodes 173H1 extended toward the first gate electrode 124H1, a plurality of second source electrodes 173H2 extended toward the second gate electrode 124H2, and a plurality of third source electrodes 173L extended toward the third gate electrode 124L.

The first drain electrode 175H1 faces the first source electrode 173H1 on the first semiconductor 154H1, the second drain electrode 175H2 faces the second source electrode 173H2 on the second semiconductor 154H2, and the third drain electrode 175L faces the third source electrode 173L on the third semiconductor 154L.

The first gate electrode 124H1, the first source electrode 173H1, and the first drain electrode 175H1 form a first switching element (QH1) that is a thin film transistor together with the first semiconductor 154H1, the second gate electrode 124H2, the second source electrode 173H2, and the second drain electrode 175H2 form a second switching element (QH2) that is a thin film transistor together with the second semiconductor 154H2, and the third gate electrode 124L, the third source electrode 173L, and the third drain electrode 175L form a third switching element (QL) that is a thin film transistor together with the third semiconductor 154L.

A passivation layer 180 is provided on the data conductor and the exposed semiconductors 154H1, 154H2, and 154L. The passivation layer 180 may include contact holes 185H1, 185H2, and 185L that extend to and expose the first drain electrode 175H1, the second drain electrode 175H2, and the third drain electrode 175L, respectively.

A first subpixel electrode 191H1, a second subpixel electrode 191H2, and a third subpixel electrode 191L are provided on the passivation layer 180.

The first subpixel electrode 191H1 may include a stem 193H1 including a horizontal unit and a vertical unit crossing each other, a plurality of fine branches 194H1 extended in an oblique direction from the stem 193H1, and a protrusion 195H1. The second subpixel electrode 191H2 may include a stem 193H2 including a horizontal unit and a vertical unit crossing each other, a plurality of fine branches 194H2 extended in the oblique direction from the stem 193H2, and a protrusion 195H2. The third subpixel electrode 191L may include a stem 193L including a horizontal unit and a vertical unit crossing each other, a plurality of fine branches 194L extended in the oblique direction from the stem 193L, and a protrusion 195L.

The first subpixel electrode 191H1 may be provided on the left with reference to the first gate line 121a, and the second subpixel electrode 191H2 and the third subpixel electrode 191L may be provided on a bottom side with reference to the first gate line 121a. The third storage line 131c may be provided between the second subpixel electrode 191H2 and the third subpixel electrode 191L.

An area of the first subpixel electrode 191H1 may be equal to or different from an area of the second subpixel electrode 191H2. An area of the third subpixel electrode 191L may be greater than an area of the first subpixel electrode 191H1 or the second subpixel electrode 191H2.

The first subpixel electrode 191H1, the second subpixel electrode 191H2, and the third subpixel electrode 191L are physically and electrically connected to the first drain electrode 175H1, the second drain electrode 175H2, and the third drain electrode 175L through the contact holes 185H1, 185H2, and 185L to receive the data voltage (Vd) when the first to third switching elements (QH1, QH2, and QL) are turned on.

Regarding the first pixel (PX1) on which the first storage electrode 137a is provided, the first drain electrode 175H1 and the first subpixel electrode 191H1 mainly overlap the first storage electrode 137a to form a first storage capacitor (Cst_H1), the second drain electrode 175H2 and the second subpixel electrode 191H2 mainly overlap the first storage electrode 137a to form a second storage capacitor (Cst_H2), and the third subpixel electrode 191L mainly overlaps the third storage line 131c to form a third storage capacitor (Cst_L).

Referring to FIG. 12, when the polarity of the data voltage (Vd) applied to the neighboring data line 171 is inverted for each column, the pixel (PX) including a first storage capacitor (Cst_H1) formed by having the first storage electrode 137a of the first storage line 131a on one pixel row as a terminal and a second storage capacitor (Cst_H2) may be alternately disposed with the pixel (PX) including a first storage capacitor (Cst_H1) formed by having the second storage electrode 137b of the second storage line 131b as a terminal and a second storage capacitor (Cst_H2).

Further, regarding one pixel array, the data line 171 connected to the pixel (PX) may be changed for each at least one pixel row, and the polarity of the voltage charged in the pixel (PX) may be alternately changed for each of at least one pixel row. In this case, the pixel (PX) including a first storage capacitor (Cst_H1) formed by having the first storage electrode 137a of the first storage line 131a as a terminal and a second storage capacitor (Cst_H2) in one pixel array and the pixel (PX) including a first storage capacitor (Cst_H1) formed by having a second storage electrode 137b of the second storage line 131b as a terminal and a second storage capacitor (Cst_H2) may be alternately disposed for each at least one pixel row.

Referring to FIG. 10 and FIG. 11, an alignment layer 11 may be provided on the first to third subpixel electrodes 191H1, 191H2, and 191L. The alignment layer 11 may be a vertical alignment layer.

A light blocking member 220 may be provided above or below the alignment layer 11. The light blocking member 220 may include a portion for covering a region in which the first to third switching elements (QH1, QH2, and QL) are provided. The position of the light blocking member 220 is not restricted to that shown in the drawing, and the light blocking member 220 may be provided to another position of the lower panel 100 or the upper panel 200.

Regarding the upper panel 200, an opposed electrode 270 may be provided on a substrate 210. The opposed electrode 270 may transmit the common voltage (Vcom). The position of the opposed electrode 270 is not restricted to that shown in the drawing, and the opposed electrode 270 may be provided on the lower panel 100. An alignment layer 21 is provided on the opposed electrode 270. The alignment layer 21 may be a vertical alignment layer.

The first subpixel electrode 191H1 forms a first liquid crystal capacitor (Clc_H1) together with the opposed electrode 270, the second subpixel electrode 191H2 forms a second liquid crystal capacitor (Clc_H2) together with the opposed electrode 270, and the third subpixel electrode 191L forms a third liquid crystal capacitor (Clc_L) together with the opposed electrode 270 to maintain the charged voltage.

FIG. 10 and FIG. 11 shows an example of a display device according to an exemplary embodiment, and it may be modifiable into various kinds of display devices without being restricted to it. For example, the substrate 210 may be omitted and a liquid crystal layer that is divided into a plurality of cells and is sealed on the substrate 110 may be included.

According to the exemplary embodiment, the data voltage (Vd) with opposite polarity may be applied to the neighboring data line 171 according to column inversion driving. For example, a positive data voltage is applied to the data line 171 connected to the first pixel (PX1) in one frame to charge the liquid crystal capacitors (Clc_H1, Clc_H2, and Clc_L) included by the first pixel (PX1) with a positive voltage, and a negative data voltage is applied to the data line 171 connected to the second pixel (PX2) that is near the first pixel (PX1) to charge the second pixel (PX2) with the negative voltage. In this case, in the corresponding frame, the first storage line 131a may be changed to the high level (V1) from the low level (V2) when the gate-off voltage (Voff) is applied to the first and second gate lines 121a and 121b, and the second storage line 131b may be changed to the low level (V2) from the high level (V1) when the gate-off voltage (Voff) is applied to the first and second gate lines 121a and 121b.

In the next frame, the data voltage (Vd) with the opposite polarity is transmitted, and the changing direction of the storage signal (Vs) transmitted by the first and second storage lines 131a and 131b becomes opposite.

According to another exemplary embodiment, differing from FIG. 10 to FIG. 12, the positions of the first subpixel electrode 191H1 and the second subpixel electrode 191H2 may be opposite to each other on the two pixels (PX) neighboring in the row direction or the column direction.

Figure 13:
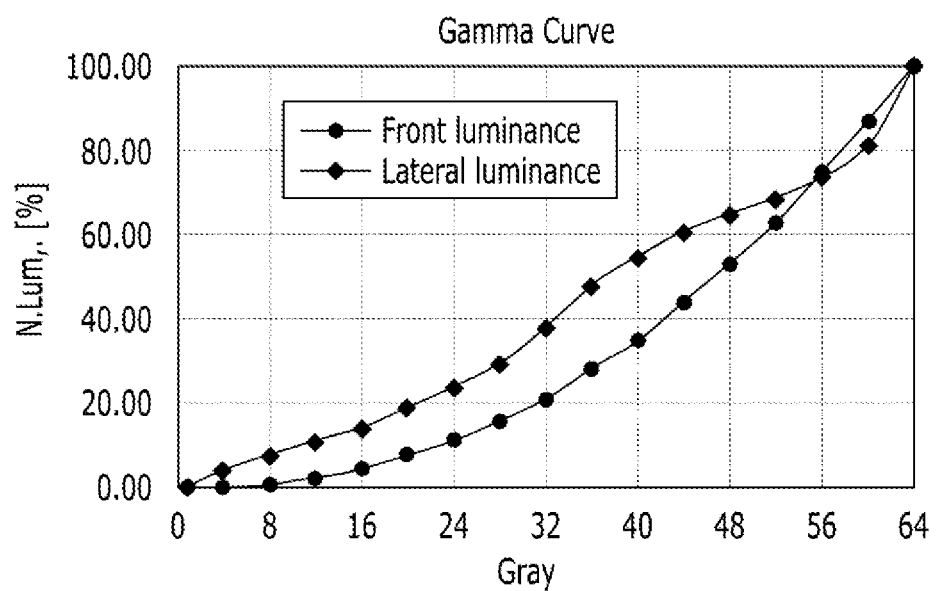
FIG. 13 and FIG. 14 show graphs for showing front luminance and lateral luminance for respective grays of an image displayed by a display device according to an exemplary embodiment.
Figure 14:
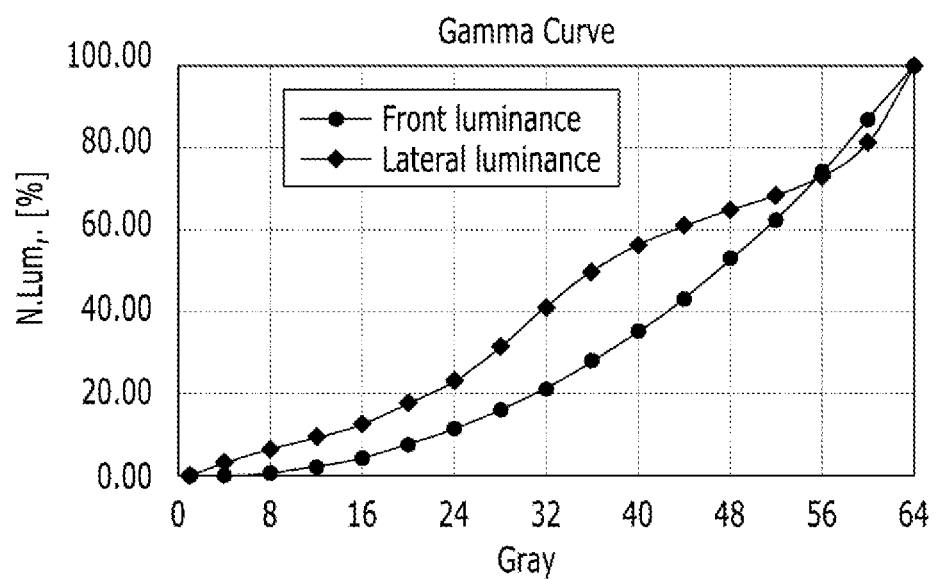

FIG. 13 and FIG. 14 show graphs of front luminance and lateral luminance for respective grays of an image displayed by a display device according to an exemplary embodiment.

Referring to FIG. 13, for example, when an area ratio of the first subpixel electrode 191H1, the second subpixel electrode 191H2, and the third subpixel electrode 191L is substantially 1:1:2, front luminance of the image looks very similar to lateral luminance.

Referring to FIG. 14, for example, when an area ratio of the first subpixel electrode 191H1, the second subpixel electrode 191H2, and the third subpixel electrode 191L is substantially 1:1:3, front luminance of the image looks very similar to lateral luminance.

According to the exemplary embodiment, the display device for improving lateral visibility and increasing transmittance by substantially approaching the change of luminance on the front side to the change of luminance on the lateral side through a simple manufacturing process may be provided.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A display device comprising:
a plurality of gate lines each for transmitting a gate signal;
a plurality of data lines each for transmitting a data voltage;
a first storage line for transmitting a first storage signal of which a voltage level is changed at least once for one frame; and
a first pixel connected to a first gate line among the gate lines, a first data line among the data lines, and the first storage line,
wherein the first pixel includes:
a first subpixel including a first switching element connected to the first gate line and the first data line, a first liquid crystal capacitor connected to an output terminal of the first switching element, and a first storage capacitor;
a second subpixel including a second switching element connected to the first gate line and the first data line, a second liquid crystal capacitor connected to an output terminal of the second switching element, and a second storage capacitor; and
a third subpixel including a third switching element connected to the first gate line and the first data line, and a third liquid crystal capacitor connected to an output terminal of the third switching element, and
the first storage capacitor and the second storage capacitor are connected to the first storage line.

2. The display device of claim 1, further comprising
a storage line driver for changing the voltage level of the first storage signal applied to the first storage line at least once after the first to third switching elements are turned off.

3. The display device of claim 2, wherein
the voltage level of the first storage signal swings between a first voltage level and a second voltage level with one horizontal period as a period.

4. The display device of claim 2, wherein
the voltage level of the first storage signal rises after the first to third switching elements are turned off in a frame in which the first data line transmits a positive data voltage, and
the voltage level of the first storage signal falls after the first to third switching elements are turned off in a frame in which the first data line transmits a negative data voltage.

5. The display device of claim 2, wherein
a changing amount of a charged voltage of the first liquid crystal capacitor is different from a changing amount of a charged voltage of the second liquid crystal capacitor when the voltage level of the first storage signal is changed.

6. The display device of claim 5, wherein
the third subpixel further includes a third storage capacitor connected to a common storage line for transmitting a predetermined voltage for one frame.

7. The display device of claim 1, further comprising
a second storage line for transmitting a second storage signal having an opposite waveform to that of the first storage signal.

8. The display device of claim 7, further comprising
a second pixel adjacent to first pixel in a row direction,
wherein the second pixel includes:
a fourth subpixel including a fourth switching element connected to the first gate line and a second data line among the data lines, a fourth liquid crystal capacitor connected to an output terminal of the fourth switching element, and a fourth storage capacitor;
a fifth subpixel including a fifth switching element connected to the first gate line and the second data line, a fifth liquid crystal capacitor connected to an output terminal of the fifth switching element, and a fifth storage capacitor; and
a sixth subpixel including a sixth switching element connected to the first gate line and the second data line, and a sixth liquid crystal capacitor connected to an output terminal of the sixth switching element, and
the fourth storage capacitor and the fifth storage capacitor are connected to the second storage line.

9. The display device of claim 8, wherein
a changing amount of a charged voltage of the fourth liquid crystal capacitor is different from a changing amount of a charged voltage of the fifth liquid crystal capacitor when a voltage level of the second storage signal is changed.

10. The display device of claim 9, wherein
the sixth subpixel further includes a sixth storage capacitor connected to a common storage line for transmitting a predetermined voltage for one frame.

11. The display device of claim 7, wherein
the first storage line and the second storage line are provided on opposite sides with respect to the first gate line.

12. The display device of claim 7, further comprising
a second pixel adjacent to the first pixel in a column direction,
wherein the second pixel includes:
a fourth subpixel including a fourth switching element connected to a second gate line and the first data line, a fourth liquid crystal capacitor connected to an output terminal of the fourth switching element, and a fourth storage capacitor;
a fifth subpixel including a fifth switching element connected to the second gate line and the first data line, a fifth liquid crystal capacitor connected to an output terminal of the fifth switching element, and a fifth storage capacitor; and
a sixth subpixel including a sixth switching element connected to the second gate line and the first data line, and a sixth liquid crystal capacitor connected to an output terminal of the sixth switching element, and
the fourth storage capacitor and the fifth storage capacitor are connected to the second storage line.

13. The display device of claim 12, wherein
a changing amount of a charged voltage of the fourth liquid crystal capacitor is different from a changing amount of a charged voltage of the fifth liquid crystal capacitor when a voltage level of the second storage signal is changed.

14. The display device of claim 1, wherein
the display device includes a plurality of pixels connected to the gate lines and the data lines,
the gate lines and the pixels are divided into a plurality of blocks, and
the display device further includes a plurality of storage transmitting lines for transmitting the first storage signal to the plurality of blocks.

15. The display device of claim 14, wherein
the first storage signals applied to different blocks among the blocks are different from each other, and
a same first storage signal is applied to a same block.

16. The display device of claim 15, wherein
after a gate-on voltage is transmitted to all of the gate lines included in one of the blocks, a voltage level of the first storage signal applied to the block is changed.

17. A method for driving a display device, the display device comprising:
a plurality of gate lines;
a plurality of data lines;
a first storage line for transmitting a first storage signal; and
a first pixel connected to a first gate line among the gate lines, a first data line among the data lines, and the first storage line,
wherein the first pixel includes:
a first subpixel including a first switching element connected to the first gate line and the first data line, a first liquid crystal capacitor connected to an output terminal of the first switching element, and a first storage capacitor;
a second subpixel including a second switching element connected to the first gate line and the first data line, a second liquid crystal capacitor connected to an output terminal of the second switching element, and a second storage capacitor; and
a third subpixel including a third switching element connected to the first gate line and the first data line, and a third liquid crystal capacitor connected to an output terminal of the third switching element, the method comprising:
transmitting a gate-on voltage to the first gate line and then transmitting a gate-off voltage to the first gate line; and
after the gate-off voltage is transmitted to the first gate line, changing a voltage level of the first storage signal applied to the first storage capacitor and the second storage capacitor at least once during a frame.

18. The method of claim 17, wherein
the voltage level of the first storage signal swings between a first voltage level and a second voltage level with one horizontal period as a period.

19. The method of claim 17, further comprising:
transmitting a positive data voltage to the data lines in a first frame; and
transmitting a negative data voltage to the data lines in a second frame,
wherein in the first frame, the voltage level of the first storage signal rises after the first to third switching elements are turned off, and
in the second frame, the voltage level of the first storage signal falls after the first to third switching elements are turned off.

20. The method of claim 17, wherein
the display device includes a plurality of pixels connected to the gate lines and the data lines,
the gate lines and the pixels are divided into a plurality of blocks,
the method further includes changing the voltage level of the first storage signal applied to a block of the plurality of blocks after the gate-on voltage is transmitted to all of the gate lines included by the block,
the first storage signals applied to different blocks are different from each other, and
a same first storage signal is applied to a same block.

* * * * *